US 9,657,957 B2

(12) United States Patent
Bergman et al.

(10) Patent No.: US 9,657,957 B2
(45) Date of Patent: May 23, 2017

(54) HVAC CONTROLLER HAVING A NETWORK-BASED SCHEDULING FEATURE

(75) Inventors: Gabriel A. Bergman, New Brighton, MN (US); Christopher Goh, Chanhassen, MN (US); Dan Murr, Mounds View, MN (US); Patrick Hudson, Elk River, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1053 days.

(21) Appl. No.: 13/559,489

(22) Filed: Jul. 26, 2012

(65) Prior Publication Data

US 2014/0031992 A1  Jan. 30, 2014

(51) Int. Cl.
| | |
|---|---|
| *G05B 13/00* | (2006.01) |
| *G05B 15/00* | (2006.01) |
| *G05B 21/00* | (2006.01) |
| *G06F 19/00* | (2011.01) |
| *G05B 11/01* | (2006.01) |
| *F24F 11/00* | (2006.01) |
| *G05D 23/19* | (2006.01) |

(52) U.S. Cl.
CPC ............ *F24F 11/00* (2013.01); *F24F 11/006* (2013.01); *G05D 23/1905* (2013.01); *F24F 2011/0067* (2013.01); *F24F 2011/0071* (2013.01)

(58) Field of Classification Search
CPC .. F24F 11/00; F24F 11/006; F24F 2011/0071; Y02B 30/78
USPC .................... 700/276, 299, 300, 301; 340/12
See application file for complete search history.

(56) References Cited

U.S. PATENT DOCUMENTS

| | | |
|---|---|---|
| 2,010,237 A | 8/1935 | Joseph |
| 5,442,730 A | 8/1995 | Bigus |
| 6,098,893 A | 8/2000 | Berglund et al. |
| 6,526,462 B1 | 2/2003 | Elabd |

(Continued)

FOREIGN PATENT DOCUMENTS

| | | |
|---|---|---|
| WO | 0057259 A2 | 9/2000 |
| WO | 0227687 A1 | 4/2002 |

(Continued)

OTHER PUBLICATIONS

"Comfort Link™ Smart Control," 2 pages, Downloaded Mar. 25, 2013.

(Continued)

*Primary Examiner* — Mohammad Ali
*Assistant Examiner* — Md Azad
(74) *Attorney, Agent, or Firm* — Seager, Tufte & Wickhem, LLP

(57) ABSTRACT

A master HVAC schedule for an HVAC controller may be stored on an external server accessible over a computer network. The external server may maintain the master HVAC schedule, and may translate a portion of the master HVAC schedule into a basic HVAC schedule that is executable by an HVAC controller. The external server may deliver the basic HVAC schedule to an HVAC controller according to a predetermined schedule. In some cases, the external server may deliver an updated basic HVAC schedule to the HVAC controller in response to a user initiated change made to the master HVAC schedule or upon restoration of a lost network connection between the HVAC controller and the external server.

26 Claims, 7 Drawing Sheets

(56) References Cited

U.S. PATENT DOCUMENTS

| | | | |
|---|---|---|---|
| 6,578,005 B1 | 6/2003 | Lessaint et al. | |
| 6,856,605 B1 | 2/2005 | Larghi et al. | |
| 6,965,313 B1 | 11/2005 | Saylor et al. | |
| 7,113,090 B1 | 9/2006 | Saylor et al. | |
| 7,124,087 B1 | 10/2006 | Rodriguez et al. | |
| 7,152,058 B2 | 12/2006 | Shotton et al. | |
| 7,257,397 B2 | 8/2007 | Shamoon et al. | |
| 7,343,226 B2 | 3/2008 | Ehlers et al. | |
| 7,434,742 B2 | 10/2008 | Mueller et al. | |
| 7,565,225 B2 | 7/2009 | Dushane et al. | |
| 7,734,572 B2 | 6/2010 | Wiemeyer et al. | |
| 7,894,944 B2 | 2/2011 | Liu et al. | |
| 7,904,209 B2 | 3/2011 | Podgorny et al. | |
| 7,963,454 B2 | 6/2011 | Sullivan et al. | |
| 8,019,567 B2 | 9/2011 | Steinberg et al. | |
| 8,024,073 B2 | 9/2011 | Imes et al. | |
| 8,050,801 B2 | 11/2011 | Richards et al. | |
| 8,063,775 B2 | 11/2011 | Reed et al. | |
| 8,082,065 B2 | 12/2011 | Imes et al. | |
| 8,099,195 B2 | 1/2012 | Imes et al. | |
| 8,108,076 B2 | 1/2012 | Imes et al. | |
| 8,131,506 B2 | 3/2012 | Steinberg et al. | |
| 8,195,309 B2 | 6/2012 | Hegde et al. | |
| 8,442,693 B2* | 5/2013 | Mirza et al. | 700/276 |
| 2003/0009771 A1 | 1/2003 | Chang | |
| 2004/0117046 A1 | 6/2004 | Colle et al. | |
| 2005/0090915 A1 | 4/2005 | Geiwitz | |
| 2006/0283965 A1 | 12/2006 | Mueller et al. | |
| 2007/0038563 A1 | 2/2007 | Ryzerski | |
| 2007/0106548 A1 | 5/2007 | Bratt | |
| 2007/0114295 A1 | 5/2007 | Jenkins | |
| 2009/0045263 A1 | 2/2009 | Mueller et al. | |
| 2009/0195349 A1 | 8/2009 | Frader-Thompson et al. | |
| 2009/0259346 A1 | 10/2009 | Reed et al. | |
| 2009/0307573 A1 | 12/2009 | Lavelle et al. | |
| 2010/0146071 A1 | 6/2010 | Comerford et al. | |
| 2010/0269049 A1 | 10/2010 | Fearon | |
| 2010/0280667 A1 | 11/2010 | Steinberg | |
| 2010/0289643 A1 | 11/2010 | Trundle et al. | |
| 2010/0324962 A1 | 12/2010 | Nesler et al. | |
| 2011/0022190 A1 | 1/2011 | Hegde et al. | |
| 2011/0106278 A1 | 5/2011 | Martin-Cocher et al. | |
| 2011/0106471 A1 | 5/2011 | Curtis et al. | |
| 2011/0190910 A1 | 8/2011 | Lombard et al. | |
| 2011/0290893 A1 | 12/2011 | Steinberg | |
| 2011/0307103 A1 | 12/2011 | Cheung et al. | |
| 2012/0005590 A1 | 1/2012 | Lombard et al. | |
| 2012/0046859 A1 | 2/2012 | Imes et al. | |
| 2012/0053739 A1 | 3/2012 | Brian et al. | |
| 2012/0065783 A1 | 3/2012 | Fadell et al. | |
| 2012/0065935 A1 | 3/2012 | Steinberg et al. | |
| 2012/0078425 A1 | 3/2012 | Gardenswartz | |
| 2012/0086562 A1* | 4/2012 | Steinberg | 340/12.32 |
| 2012/0232678 A1 | 9/2012 | Hegde et al. | |
| 2012/0310416 A1* | 12/2012 | Tepper et al. | 700/276 |
| 2013/0090767 A1* | 4/2013 | Bruck et al. | 700/276 |
| 2013/0178986 A1* | 7/2013 | Lombard et al. | 700/276 |

FOREIGN PATENT DOCUMENTS

| | | |
|---|---|---|
| WO | WO 2005013231 | 2/2005 |
| WO | WO 2012068517 | 5/2012 |

OTHER PUBLICATIONS

Alarm.com, "empower™, Technical Tips." 9 pages, Downloaded May 30, 2012.
Honeywell, "Excel Building Supervisor-Integrated R7044 and FS90 Ver. 20," Operator Manual, 70 pages, Apr. 1995.
http://www/exefind.com/cybermatrix-meeting-manager, "CyberMatrix Meeting Manager Web," 1 page, printed Dec. 2, 2008.
Intwine Energy, "IECT-210," 1 page, Downloaded Mar. 2, 2012.
Intwine Energy, "Intwine Solutions," 2 pages, copyright 2010. http://www.intwineenergy.com/penhems.html.
Jacobson, "Alarm.com Cloud Service May Yield Smartest Thermostat on the Planet," 6 pages, Downloaded Jan. 31, 2013. www.cepro.com/article/alarmcom_icloud_service_may_yield_smartest_thermostat_on_the_planet/D2/.
Nexia, "Trane Home Energy Management Thermostat," Printed Mar. 25, 2013.
Nichols et al., "Generating Remote Control Interfaces for Complex Appliances," vol. 4 Issue 2, pp. 161-170, Downloaded Mar. 25, 2013.
Proliphix, "Basic Series Network Thermostat Configuration Guide," Release 3.0 Revision 1, 86 pages, Jun. 2007. Part No. 600-01000-201.
Proliphix, "Proliphix IP Devices: HTTP API," Revison 1.8, 28 pages, Jan. 23, 2006.
Proliphix, "Proliphix NT10e and NT20e Configuration Guide," Revision 2.0, 54 pages, Downloaded Feb. 29, 2008.
Proliphix, "Proliphix Remote Management User Guide," 12 pages, Apr. 23, 2008.
Proliphix, "Web Enabled IP Thermostats," 2 pages, Downloaded Jun. 11, 2007.
Radio Thermostat, "Install Guide CT80," 8 pages, Downloaded Apr. 26, 2011. 1812-003-000.
Radio Thermostat, "Intro," 3 pages, Printed Mar. 25, 2013.
Radio Thermostat, "Operation Guide CT80," 8 pages, Downloaded Mar. 14, 2011.
Sync Blog, "How to Control your Thermostat from Anywhere Without Breaking the Bank," 8 pages, Downloaded Mar. 25, 2013.
Sync Blog, "How to Control Your Thermostat from Anywhere Without Breaking the Bank (2)," 9 pages, Downloaded Mar. 25, 2013.
Trane, "System Programming, Tracer Summit Version 14 BMTW-SVP01D-EN," 623 pages, 2002.
www.prothermostats.com/product.php?product=110240. "Proliphix NT10e Programmable Internet Thermostat," 2 pages, Printed Mar. 25, 2013.
Xfinity, "Web Portal," 2 pages, Downloaded Mar. 2, 2012. http://www.comcast.com/homesecurity/features-web.htm/SCRedirect=true.
Edina Realty, "Warranties," 3 pages, before 2014.
"Earth Networks and EnergyHub Debut e5 Home Energy Demand Response Program Based on Neighborhood-LEvel, Real-Time Weather," EnergyHub, 2 pages, Jan. 24, 2012. http://www.energyhub.com/news/earth-networks-and-energyhub-debut-e5-home-energy-d . . . .
St. John, Jeff., "Smart Gri'd Latest Cloud: Honeywell Cloud-Connected Thermostats," 7 pages, Nov. 3, 2011.
Alarm.com "Keep it cozy," 1 page, printed Apr. 24, 2012.
LaMonica, Martin, "Smart thermostat links to cloud for energy savings," 3 pages, printed Apr. 24, 2012. http://news.cnet.com/8031-11128_3-20086261-54/smart-thermost-links-to-cloud-for-ene . . . .
Mozer, Michael C., "The Neural Network House: An Environment that Adapts to its Inhabitants," Department of Computer Science and Institute of Cognitive Science University of Colorado, 5 pages, 1998.
Alarm.com "Alarm.com Cloud Services May Yield Smartest Thermostats on the planet," 2 pages, printed Apr. 24, 2012. http://www.alarm.com/about/media/MediaGeneric.aspx?cmid=39.
Jacobson, Julie, "Xfinity Expands Home Automation with Ecofactor Cloud-Based Enabled Thermostats," 4 pages, Mar. 5, 2012. http://www.cepro.com/article/print/xfinity_expands_home_automation_with_ecofactor_cl . . . .
Castle, Steven., "Ready for Thermostat Wars?", 3 pages, May 8, 2012. http://greentechadvocates.com/2012/03/08/ready-for-thermostat-wars/.
Alarm.com "Company Information," 1 page, Printed Apr. 24, 2012.
Xytronix Research & Design, Inc., "X-300 User's Manual, Revision 1.2" 89 pages, Jul. 30, 2009.

* cited by examiner

HVAC CONTROLLER HAVING A NETWORK-BASED SCHEDULING FEATURE

CROSS-REFERENCE TO RELATED APPLICATIONS

This application is related to application Ser. No. 13/559,443 entitled "HVAC CONTROLLER WITH WIRELESS NETWORK BASED OCCUPANCY DETECTION AND CONTROL" and Application Ser. No. 13/559,470 entitled "METHOD OF ASSOCIATING AN HVAC CONTROLLER WITH AN EXTERNAL WEB SERVICE", both filed on the same day herewith and both incorporated herein by reference in their entireties for all purposes.

TECHNICAL FIELD

The present disclosure relates generally to HVAC systems, and more particularly to HVAC controllers that accommodate and/or facilitate control of an HVAC system from a remote location.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. In some cases, it may be desirable for a user to be able to affect the operation of an HVAC system from a remote location.

SUMMARY

The present disclosure relates generally to HVAC systems, and more particularly to HVAC controllers that accommodate and/or facilitate control of an HVAC system from a remote location. In one illustrative embodiment, an HVAC controller for controlling one or more HVAC components of an HVAC system in accordance with a programmable HVAC schedule includes an output port for sending one or more control signals to one or more HVAC components, a communications port for receiving data from a remote server via a computer network, a memory having at least one day of a programmable HVAC schedule stored therein, and a controller coupled to the output port, the communications port and the memory. In some instances, the controller is configured to output one or more control signal via the output port to control the one or more HVAC components in accordance with the programmable HVAC schedule stored in the memory, and to receive an updated HVAC schedule having scheduling data for at least one day from the remote server via the communications port. The controller may overwrite at least one day of the programmable HVAC schedule stored in the memory of the HVAC controller with scheduling data from the updated HVAC schedule. In some cases, the controller may receive an updated HVAC schedule from the remote server in accordance with a predetermined schedule, but this is not required.

In another illustrative embodiment, an HVAC controller may receive an HVAC schedule having at least one day from a remote server. The HVAC schedule may be stored in a memory of the HVAC controller. The HVAC controller may operate the HVAC system in accordance with the HVAC schedule. Later, an updated HVAC schedule may be received from the remote server. The updated HVAC schedule may include scheduling data for one or more additional days beyond the at least one day of the HVAC schedule. The HVAC controller may overwrite at least one day of the HVAC schedule with scheduling data from the updated HVAC schedule.

In another illustrative embodiment, a server accessible over a computer network can include an input/output port for sending and/or receiving data via the computer network, a data storage device, and a controller coupled to the input/output port and the data storage device. In some instances the controller may be configured to maintain a master HVAC schedule having up to 366 days and to translate a sub-portion of the master HVAC schedule into a basic HVAC schedule having at least one less day than the master HVAC schedule. The controller is further configured to deliver the basic HVAC schedule to an HVAC controller over the computer network via the input/output port of the server. In some instances, the controller may be configured to deliver the basic HVAC schedule to an HVAC controller in accordance with a predetermined schedule. In other instances, the controller may deliver an updated basic HVAC schedule to an HVAC controller in response to a change or update to the master HVAC schedule initiated by a user. These are just examples.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
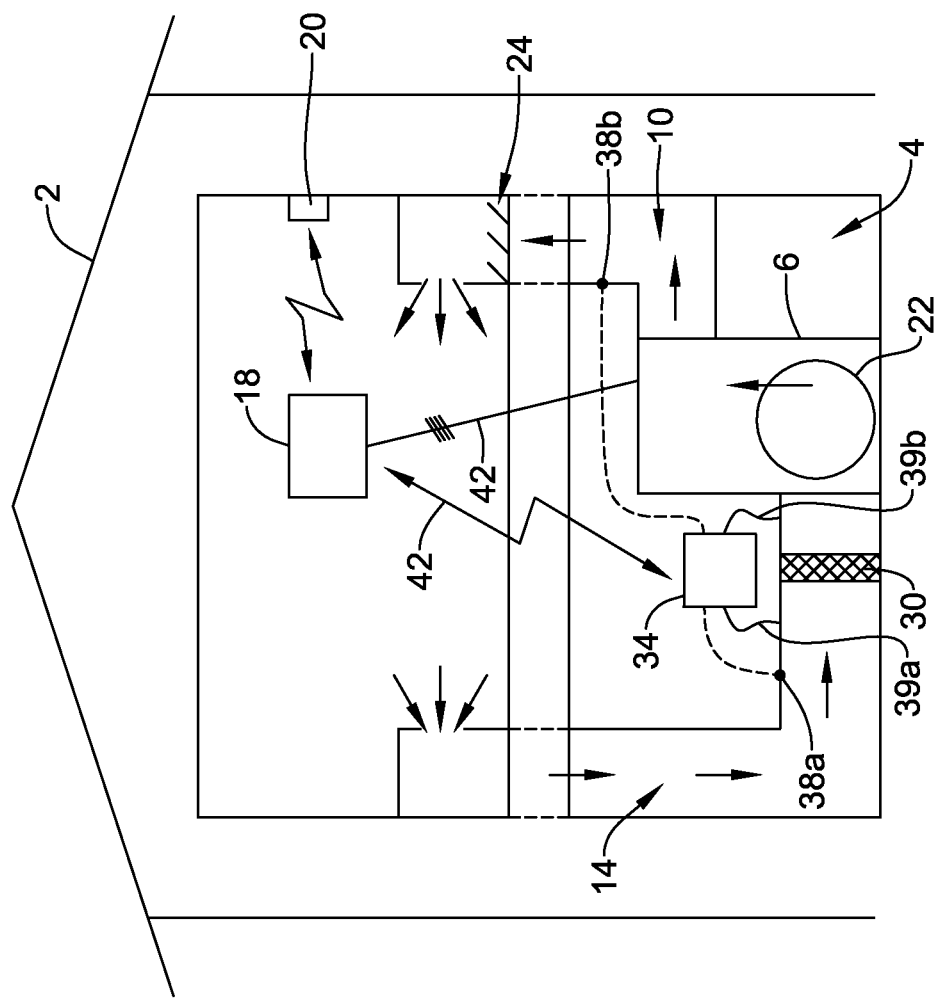
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. The HVAC system 4 may include an internet gateway or other device such as communication link 20 that may allow one or more of the HVAC components, as described herein, to communicate over a wide area network (WAN) such as, for example, the Internet. In some cases, the communication link 20 may be integrated into the HVAC controller 18, but this is not required.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.−return air temp.). For the cooling mode, the delta T may be calculated by subtracting the discharge air temperature from the return air temperature (e.g. delta T=return air temp.−discharge air temp.).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
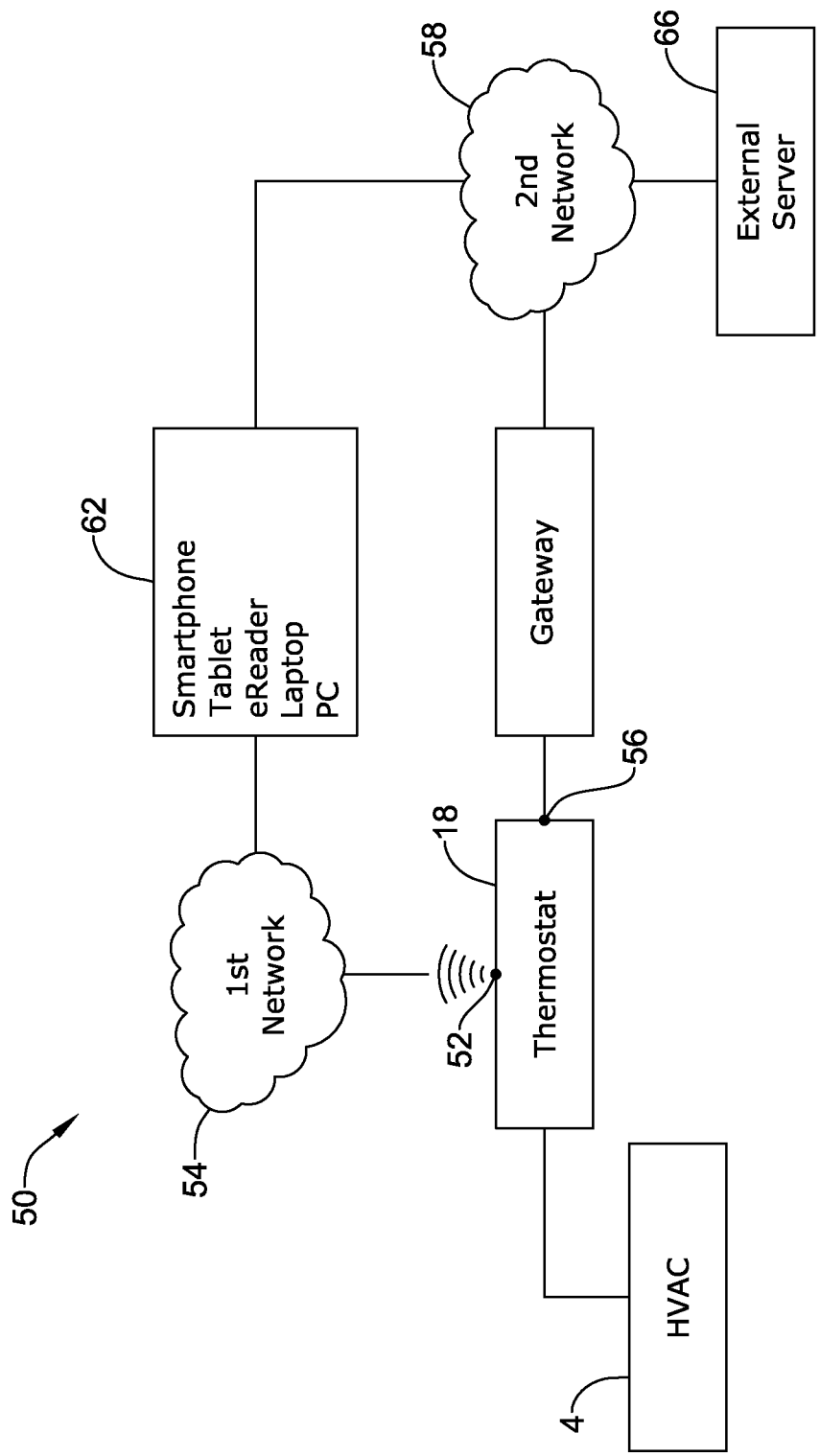
FIG. 2 is a schematic view of an illustrative HVAC control system that may facilitate access and/or control of the HVAC system of FIG. 1.

FIG. 2 is a schematic view of an HVAC control system 50 that facilitates remote access and/or control of the HVAC system 4 shown in FIG. 1. The illustrative HVAC control system 50 includes an HVAC controller, as for example, HVAC controller 18 (see FIG. 1) that is configured to communicate with and control one or more components 6 of the HVAC system 4. As discussed above, the HVAC controller 18 may communicate with the one or more components 6 of the HVAC system 4 via a wired or wireless link. Additionally, the HVAC controller 18 may be adapted to communicate over one or more wired or wireless networks that may accommodate remote access and/or control of the HVAC controller 18 via another device such as a cell phone, tablet, reader, laptop computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

Depending upon the application and/or where the HVAC user is located, remote access and/or control of the HVAC controller 18 may be provided over the first network 54 and/or the second network 58. A variety of mobile wireless devices 62 may be used to access and/or control the HVAC controller 18 from a remote location (e.g. remote from HVAC Controller 18) over the first network 54 and/or second network 58 including, but not limited to, mobile phones including smart phones, PDAs, tablet computers, laptop or personal computers, wireless network-enabled key fobs, e-Readers and the like.

In many cases, the mobile wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the second network 58 with an external web service hosted by one or more external web servers 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like. In some instances, the HVAC controller 18 may be configured to receive one or more user profiles having at least one operational parameter setting that is selected by and reflective of a user's preferences. Additionally, the HVAC controller 18 may be configured to receive local weather data, weather alerts and/or warnings, major stock index ticker data, and/or news headlines over the second network 58. These are just some examples.

Figure 3:
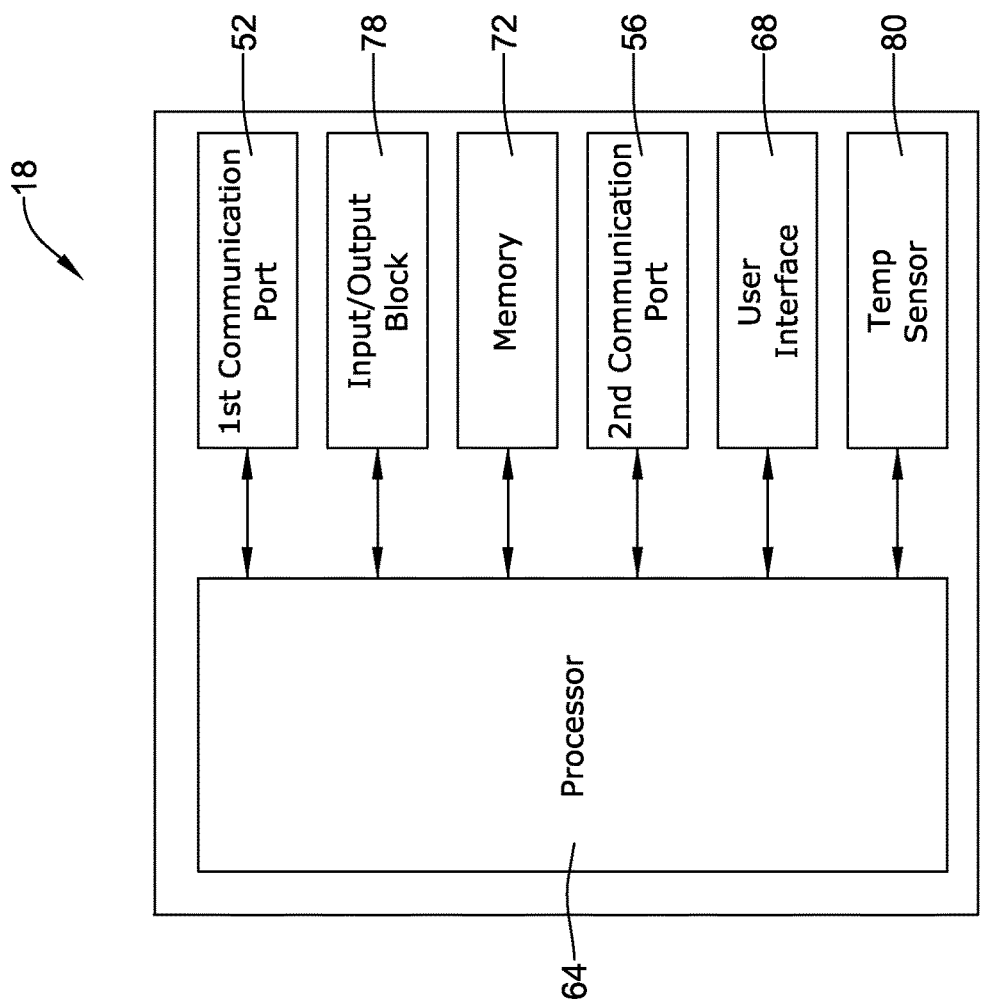
FIG. 3 is a schematic block diagram of an illustrative HVAC controller.

FIG. 3 is a schematic view of an illustrative HVAC controller 18 that may be accessed and/or controlled from a remote location over the first network 54 and/or the second network 58 (FIG. 2) using a mobile wireless device 62 such as, for example, a smart phone, a PDA, a tablet computer, a laptop or personal computer, a wireless network-enabled key fob, an e-Reader, and/or the like. In some instances, the HVAC controller 18 may be a thermostat, but this is not required. As shown in FIGS. 2 and 3, the HVAC controller 18 may include a first communications port 52 for communicating over a first network (e.g. wireless LAN) and a second communications port 56 for communicating over a second network (e.g. WAN or the Internet). The first communications port 52 can be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 68, but this is not required.

In some cases, HVAC controller 18 may include a timer (not shown). The timer may be integral to the processor 64 or may be provided as a separate component. The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition to, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

The HVAC controller 18 may also include an internal temperature sensor 80, but this is not required. In some cases, the HVAC controller 18 may communicate with one or more remote temperature sensors, humidity sensors, and/or occupancy sensors located throughout the building or structure. The HVAC controller may communicate with a temperature sensor and/or humidity sensor located outside of the building or structure for sensing an outdoor temperature and/or humidity if desired.

The processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service over the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service over the second network. In some cases, the control algorithm may include settings such as set points.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a user interface, and/or through an external web service and delivered to the HVAC controller via the second network 58 where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service and stored on an external web server. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases where two or more user profiles are associated with the HVAC controller 18, the processor 64 may be programmed to include a set of rules for determining which individual user profile takes precedence for controlling the HVAC system when both user profiles are active.

In the illustrative embodiment of FIG. 3, the user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, starting times, ending times, schedule times, diagnostic limits, responses to alerts, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both display and keypad. The touch screen LCD panel may be adapted to solicit values for a number of operating parameters and/or to receive such values, but this is not required. In still other cases, the user interface 68 may be a dynamic graphical user interface.

In some instances, the user interface 68 need not be physically accessible to a user at the HVAC controller 18. Instead, the user interface 68 may be a virtual user interface 68 that is accessible via the first network 54 and/or second network 58 using a mobile wireless device such as one of those devices 62 previously described herein. In some cases, the virtual user interface 68 may include one or more web pages that are broadcasted over the first network 54 (e.g. LAN) by an internal web server implemented by the processor 64. When so provided, the virtual user interface 68 may be accessed over the first network 54 using a mobile wireless device 62 such as any one of those listed above. Through the one or more web pages, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, and the like.

In other cases, the virtual user interface 68 may include one or more web pages that are broadcasted over the second network 58 (e.g. WAN or the Internet) by an external web server (e.g. web server 66). The one or more web pages forming the virtual user interface 68 may be hosted by an external web service and associated with a user account having one or more user profiles. The external web server 66 may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the second network 58 to the HVAC controller 18 where it is received via the second port 56 and may be stored in the memory 72 for execution by the processor 64.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

Referring back generally to FIG. 2, any number or wired or wireless devices, including the HVAC controller 18 and a user's mobile wireless device 62, may be connected to and enrolled in a building's wireless local area network 54. In some cases, the HVAC controller 18 may be configured to execute a program code stored in the memory 72 for connecting to and enrolling with the wireless local area network 54 of the building in which it is located. Each device may be assigned a unique identifier (e.g. IP address) upon enrollment with the wireless local area network. The unique identifier may be assigned by a router or other gateway device. The router or gateway device may store a local cache containing a list of unique identifiers (e.g. IP addresses) for each of the devices connected to the wireless local area network. The router or gateway can be a separate device from the HVAC controller 18, but this is not required. In some cases, a MAC address or MAC CRC address provided by the device being enrolled in the wireless local area network host upon connection of the device to the network may be used to uniquely identify the device on the wireless local area network 54 and/or wireless network 58. The unique identifier may be used to identify and recognize each device on the wireless local area network 54 each time the device is connected to the wireless local area network 54 and/or wireless network 58.

Figure 4:
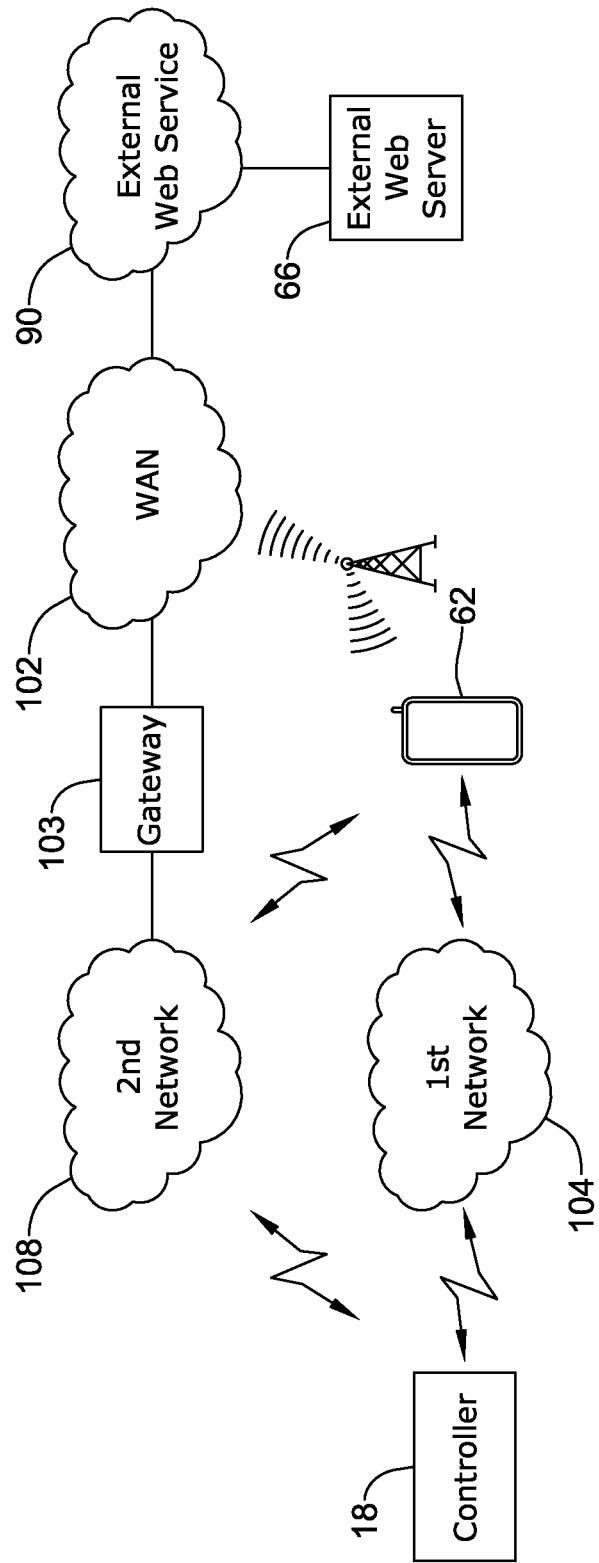
FIG. 4 is a schematic diagram of an HVAC controller in communication with a remote wireless device and an external web service.

FIG. 4 is a schematic diagram of an HVAC controller 18 in communication with a remote wireless device 62 and an external web service 90 hosted by an external web server 66 through a wide area network 102. In some cases, the HVAC controller 18 may be programmed to configure itself as a wireless access point for hosting its own wireless network upon initial installation of the HVAC controller 18 within a building or structure, and may be programmed to accept a wireless connection with a remote wireless device 62. The remote wireless device 62 may be any one of the wireless devices described herein. In some cases, the remote wireless device 62 may be programmed to execute an application code that may cause the wireless device 62 to search for available wireless networks within and/or in close proximity to the building or structure in which the HVAC controller 18 is located. Since the HVAC controller 18 may be initially configured as a wireless access point, the application code may cause the wireless device 62 to detect the wireless network hosted at the HVAC controller 18, and to display the HVAC controller's wireless network on the user interface of the wireless device 62 as being available for connection. The HVAC controller's wireless network may be displayed as one selectable option among a list of other wireless networks available for connection. A user may initiate connection to the HVAC controller's wireless network by selecting of the HVAC controller's wireless network from the list of wireless network's available for connection displayed on the user interface of the remote wireless device 62.

A first wireless network 104 may be established between the HVAC controller 18 and a wireless device 62 upon acceptance of the connection from the remote wireless device 62. Additionally, the HVAC controller 18 may be configured to connect to a second wireless network 108. In some cases, the first wireless network 104 and the second wireless network 108 are both WiFi wireless networks. In other cases, the first wireless network 104 may be a blue tooth wireless network and the second wireless network 108 may be a WiFi wireless network. In still other cases, the first wireless network 104 may be a ZigBee wireless network and the second wireless network 108 may be a WiFi wireless network. These are just some examples. It is contemplated that the first network 104 and the second network 108 may be any suitable network, as desired.

In many cases, the second wireless network 108 may be capable of communicating over a wide area network 102 via a router or gateway 103 for accessing an external web service 90 hosted by an external web server 66. The external web service 90 may include a user account having one or more user profiles that may be associated with the HVAC controller 18. The external web service 90 may provide additional functionalities and or programming capabilities that may not otherwise be available at the HVAC controller 18, or through the user interface of the remote device 62. Additionally, the external web service may be programmed to receive selected data from the HVAC controller 18 over the wide area network 102 via the second wireless network 108 and/or WAN 102. When provided, the data received from the HVAC controller 18 may be analyzed to determine a user's energy usage trends, determine a performance of the HVAC system, detect and/or predict occupancy of the building, and/or perform any other suitable analysis as desired.

In some cases, the HVAC controller 18 may be programmed to receive one or more access parameters for accessing the second wireless network 108 over the first wireless network 104 from the user's wireless device 62. In some cases, the second wireless network 108 may be a wireless local area network of the building or structure in which the HVAC controller 18 is installed. The one or more access parameters may include a service set identifier (SSID) for the second wireless network 108 and/or passcode required to gain access to the second wireless network 108. In some cases, the one or more access parameters for accessing the second wireless network 108 may have been previously entered by a user through the user interface of the user's wireless device 62, and may be stored in the memory of the wireless device 62. For example, in some cases, the user's wireless device 62 may be configured to execute an application program (e.g. app) that solicits and accepts via the user interface of the device 62 one or more access parameters for accessing the second wireless network 108. The application program may be provided by and downloaded from the external web service 90 for this purpose, but this is not required. This may be performed by a user when connecting their wireless device 62 to the building's wireless local area network (second wireless network 108). As such, the user's wireless device 62 may already store the one or more access parameters for the second wireless network 108, which may then be passed to the HVAC controller 18 when the wireless device 62 is connected to the HVAC controller 18 via the first wireless network 104.

In some cases, upon connection of the wireless device 62 to the HVAC controller 18 via the first wireless network 104, the HVAC controller 18 may be configured to implement a web server for serving up one or more web pages over the first wireless network 104 that may be displayed and viewed on the user interface of the wireless device 62. The one or more web pages displayed on the user interface of the wireless device 62 may solicit and accept the one or more access parameters for accessing the second wireless network 108 from a user.

Once the one or more access parameters are provided to the HVAC controller 18 via the first wireless network 104, the HVAC controller 18 may be programmed to use, at least in part, the one or more access parameters to connect to the second wireless network 108. In some cases, the HVAC controller 18 may be programmed to connect to the second wireless network 108 as a network client device using the one or more access parameters received from the user's wireless device 62, making the HVAC controller 18 available on the second network 108. In some cases, the HVAC controller 18 may be programmed to first disconnect itself from the first wireless network 104 established between the HVAC controller 18 and the user's wireless device 62 before connecting to the second wireless network 108 as a network client. For example, and in some cases, the HVAC controller 18 may be programmed to perform a reset, and on initialization, may automatically connect to the second wireless network 108 using the one or more access parameters.

In some cases, before connecting to the second network 108, the HVAC controller 18 may be further programmed to transmit one or more registration parameters over the first wireless network 104 to the user's wireless device 62. The one or more registration parameters may be stored in the memory 72 of the HVAC controller 18 and may be used to uniquely identify the HVAC controller 18 to the external web service 90. In some cases, the one or more registration parameters are pre-loaded into the memory 72 of the HVAC controller at the factory. The one or more registration parameters may include, for example, a Media Access Control address (MAC address) and/or cyclic redundancy check code (CRC code) of the HVAC controller 18. These are just examples. The one or more registration parameters may be received by the user's wireless device 62 and stored in the device memory for later use. In some cases, the one or more registration parameters may be embedded or encoded in a hyperlink that may be delivered from the HVAC controller 18 to the user's wireless device 62 over the first network 104. The hyperlink may be provided on a web page served up by the HVAC controller on the first network 104 and that is viewable on the user interface of the user's wireless device 62. The hyperlink may be available for selection by a user through the user interface of the wireless device 62 such that the hyperlink, when selected by a user, may link to the external web service 90. In response, the external web service 90 may display a web page on the user interface of the wireless device 62 prompting the user to enter a user login and password to gain access to a user account hosted by the external web service 90. Upon successful login in to the user account, the external web service 90 may associate the one or more registration parameters received from the wireless device 62 with the user account.

Rather than embedding the one or more registration parameters in a hyperlink, in some cases, the user's wireless device 62 may be programmed to automatically receives the one or more registration parameters from the HVAC controller 18 when the wireless device 62 is connected to the HVAC controller 18, and to provide the one or more registration parameters to the external web service 90. In some cases, this functionality may be provided by an application program (e.g. app) that is downloaded from the external web service 90 for this purpose, but this is not required. In other cases, the application program may be available for download from another web service such as, for example, Apple's iTunes or Google's App Store. In any event, upon login to a user account of the external web service 90, the application program may automatically transmit the one or more registration parameters to the external web service 90. In some cases, the external web service 90 may use the one or more registration parameters to associate a particular HVAC controller with a particular user's account, and in some cases, may be used to differentiate between two or more HVAC controllers that are associated with a single user account.

In some cases, the wireless device 62 may be further programmed to provide a geographical location of the HVAC controller 18 to the external web service 90. In one example, the same application program that causes the wireless device 62 to transmit the one or more registration parameters that uniquely identify the HVAC controller 18 to the external web service 90 may also cause the wireless device 62 to transmit geographical location information identifying the geographical location of the HVAC controller to the external web service 90. When so provided, the external web service 90 may receive the location data associated HVAC controller 18 and associate the location data with the user's account. In some cases, it may be possible to have two HVAC controllers located in two different geographical locations (e.g. home and cabin) associated with a single user account. The external web service 90 may be configured to differentiate between the two or more HVAC controllers 18 associated with a single user account through the one or more registration parameters and the geographical location associated with each of the different thermostats.

Figure 5:
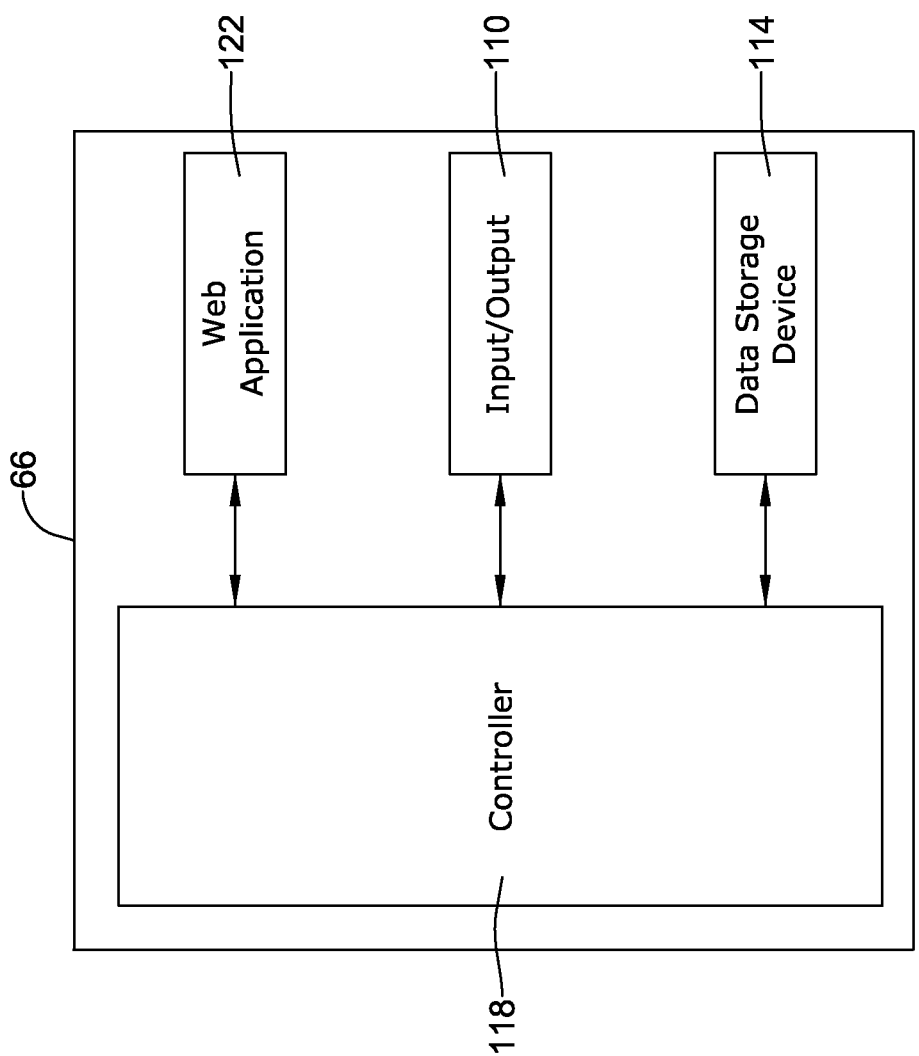
FIG. 5 is a schematic diagram of an external server for hosting an external web service.

FIG. 5 is a schematic view of an external web server 66 for hosting an external web service 90. As discussed above with reference to FIG. 4, the external web server 66 and the external web service 90 may be accessed by a user over a wide area network 102 such as, for example, the Internet using a remote device 62. The remote device 62 may be, for example, any one of the devices 62 described herein. Additionally, the external web server 66 may be coupled to the HVAC controller 18 over the wide area network 102 via a second network 108 (e.g. a building's wireless local area network) as described herein.

As shown in FIG. 5, the external web server 66 can include at least one input/output port 110 for sending and/or receiving data over the wide area network 102 to and from the HVAC controller 18 and/or another remote device 62. The external web server 66 can also include a data storage device 114, and a controller 118 coupled to the input output port 110 and the data storage device 114. In some cases, the controller 118 may be configured to implement a web application 122 for serving up one or more web pages over the wide area network 102 via the input/output port 110. The one or more web pages may be accessed and viewed by a user through the user interface of the remote device 62 over the wide area network 102 and/or a second network 108, as described herein. In some cases, the one or more web pages may provide a virtual user interface 68 (FIG. 3) for controlling the HVAC controller 18. Through the one or more web pages forming the virtual user interface 68, a user may respond to alerts and may enter or change various HVAC operating parameters including, but not limited, to temperature set points, humidity set points, starting times, ending times, schedule times, diagnostic limits, and/or the like, as well as respond to one or more alerts.

Figure 6:
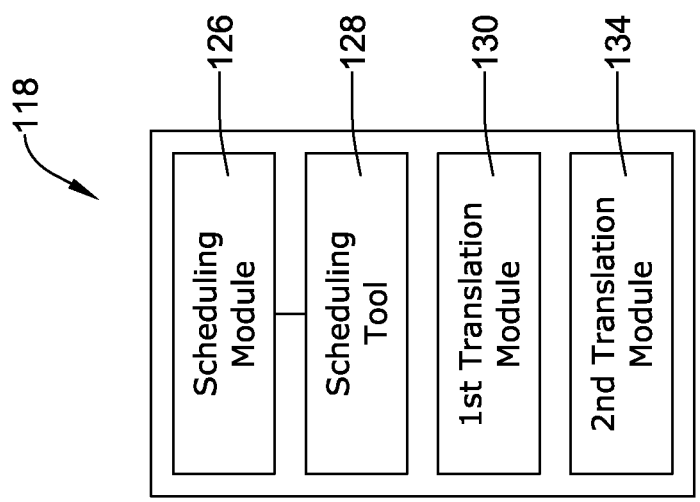
FIG. 6 is a schematic diagram an external server controller.

FIG. 6 is a schematic view of the controller 118 of the external web server 66 of FIG. 5. In some cases, the controller 118 may be programmed to include a scheduling module 126 for building a master HVAC operating schedule that may be stored on the data storage device 114. The master HVAC schedule may be associated with a user account hosted by the external web service 90, and may include a master HVAC operating schedule. The master HVAC operating schedule may include HVAC scheduling data including starting times, ending times, operating modes, and/or operating parameter set points. In some cases, the master HVAC operating schedule may include HVAC scheduling data for at least one day and, in some cases, up to 366 days or more In some cases, the master HVAC operating schedule may contain two or more schedulable time periods per day, where each time period may have a corresponding operating parameter set point and/or operating mode (e.g. heating or cooling). This is just one example. It will be understood by those of skill in the art that the master HVAC operating schedule may include fewer or greater schedulable time periods per day. In many cases, the master HVAC operating schedule has at least one schedulable time periods per day. The operating parameter set point may include, for example, a temperature set point and/or a humidity set point. Each operating parameter set point may be associated with the appropriate operating mode (e.g. heating or cooling) of the HVAC system. In some cases, the master HVAC operating schedule may have multiple schedule time periods per day. For example, in some cases, the master HVAC operating schedule may have four schedulable time periods per day, corresponding to a wake period, a leave period, a return period and sleep period. Each of the wake period, leave period, return period and sleep period may have a corresponding operating parameter set point and/or operating mode. In other cases, the master HVAC schedule may have more or less time periods per day, as necessary or desired.

In some cases, the master HVAC operating schedule may be initially provided by the external web service 90, and may include a number of default time periods for each day. Each time period may have a corresponding default operating parameter set point. The user may develop their own master HVAC operating schedule by making changes to the default master HVAC schedule maintained by the external web service 90.

In some cases, the scheduling module 126 may include a scheduling tool 128 for guiding a user through building their own master HVAC schedule. In some cases, the scheduling tool 128 may be an application programming interface (API) that may be stored in the data storage device 114, and that may cause the controller 118 to display a series of web pages that may prompt a user to enter information regarding their daily schedule and preferred comfort levels. Additionally, through the one or more web pages displayed by the scheduling tool 128, the user may be prompted to enter information regarding holidays (e.g. federal holidays, bank holidays, school holidays, business holidays and/or religious holidays) and any upcoming vacations that the user may be aware of at the time of building the master HVAC schedule. The scheduling tool 128 may use the information provided by the user to build a master HVAC schedule that may be stored on the data storage device 114. This may be similar to the method for building an HVAC schedule shown and described in U.S. patent application Ser. No. 12/424,931, entitled "HVAC CONTROLLER WITH GUIDED SCHEDULE PROGRAMMING", which is incorporated herein by reference in its entirety for all purposes. However, rather than being developed for only seven days, a master HVAC operating schedule may be developed for up to 366 days or more, if desired.

Alternatively, or in addition, the controller 118 may be programmed to receive scheduling data from a third party calendar application. In some cases, this feature may be provided as a part of the scheduling tool 128. For example, the scheduling tool 128 may display a web page prompting the user to grant access to a third party calendar application utilized by the user. Exemplary third party calendar applications may include GOOGLE® Calendar, MICROSOFT® OUTLOOK® Calendar, and YAHOO!® Calendar, but these are only examples. In some cases, the controller 118 may include a translation module 130 for translating at least portion of the data received from a third party calendar application into the master HVAC schedule. The translation module 130 may be another application programming interface (API) that is capable of translating or mapping the third party calendar data into the master HVAC operating schedule format.

The master HVAC operating schedule may be stored in the data storage device 114 and may be associated with a user's account. Upon accessing their user account hosted by the external web service 90, a user may make changes to and/or update the master HVAC schedule stored in the data storage device 114. Additionally, in some cases, the controller 118 may be programmed to periodically access and synch-up with a third party calendar application utilized by the user. In this example, the controller 118 may be programmed to periodically access and receive data from a third party calendar application and automatically update the master HVAC schedule maintained in the data storage device 114 accordingly.

According to various illustrative embodiments, the controller 118 may be further configured to translate at least a portion or a sub-portion of the master HVAC schedule into a basic HVAC schedule. In some cases, the controller 118 may include an additional translation module 134 for translating a portion or a sub-portion of the master HVAC schedule into a basic HVAC schedule. The translation module 134 may be an application programming interface (API) that translates data from the more complex and/or lengthy master HVAC schedule into a basic HVAC schedule that is readily understood and executable at the HVAC schedule. The basic HVAC schedule may have a simplified format, and may have HVAC start times, end times, operating modes and/or operating parameter set points for at least one day, but typically less than eight days. This is just one example. In some cases, the basic HVAC schedule may include more than eight days. Additionally, the basic HVAC schedule may cover at least one less day than the master HVAC schedule. This is recognition that the HVAC controller 18 may have significant memory and processing constraints, at least relative to that available at the external web server 66. In some cases, the basic HVAC schedule may be a seven day schedule, with at least one schedulable time period per day, but this is not required.

The controller 118 may deliver the basic HVAC schedule to the HVAC controller 18 over a wide area network 102 via the input/output port 110 of the external server 66. In some cases, the controller 118 may be configured to deliver the basic HVAC schedule in accordance with a predetermined schedule (e.g. once every 24 hours, 48 hours, 72 hours, weekly, bi-weekly, etc.). Alternatively, or in addition, the controller 118 may be programmed to deliver an updated basic HVAC schedule to the HVAC controller 18 in response to a change or an update to the master HVAC schedule stored in the data storage device 114. The change or update may be a change or update initiated by a user. The change or update to the master HVAC schedule may be initiated by the user over a wide area network 102 via a virtual user interface 68 using a remote device 62. In some cases, the updated basic HVAC schedule may include at least one time period not covered by the previously delivered basic HVAC schedule. In other cases, the updated basic HVAC schedule may include at least one day not covered by the previously delivered master HVAC schedule. The controller 118 may also be programmed to deliver an updated basic HVAC schedule to the HVAC controller 18 upon restoration of a lost network connection between the HVAC controller 18 and the external web server 66. Additionally, when a network connection is lost between the HVAC controller 18 and the external web server 66, the HVAC controller 18 may continue to control the HVAC system according to the basic HVAC schedule previously stored in the HVAC controller memory 72 until the network connection has been restored and/or the HVAC controller 18 has received an updated basic HVAC schedule from the external web server 66.

Referring now back to FIG. 4, the HVAC controller 18 may receive an updated basic HVAC schedule from external web server 66 over the wide area network 102 via the second network 108. The HVAC controller 18 may receive the updated basic HVAC schedule in accordance with a predetermined schedule, as described herein, or in response to a change initiated by a user or a user request. In other cases, the HVAC controller 18 may be programmed to automatically connect with the external web server 66 (if not already connected) and receive an updated basic HVAC schedule in accordance with a predetermined schedule. Upon receiving an updated basic HVAC schedule from the external web server 66, the HVAC controller 18 may be programmed to overwrite at least a portion of the HVAC schedule previously stored in the HVAC controller memory 72 with scheduling data from the updated HVAC schedule. In one example, two or more days of an HVAC schedule may have been previously stored in the memory 72 of the HVAC controller 18. Upon receiving an updated basic HVAC schedule from the external server 66, the HVAC controller 18 may be programmed to overwrite at least one previous day of the HVAC schedule stored in the memory 72 with at least some of the scheduling data of the updated basic HVAC schedule. In some cases, the HVAC controller 18 may be programmed to overwrite all but the current day of the HVAC schedule previously stored in the memory 72 with at least some of the scheduling data from the updated basic HVAC schedule.

Figure 7:
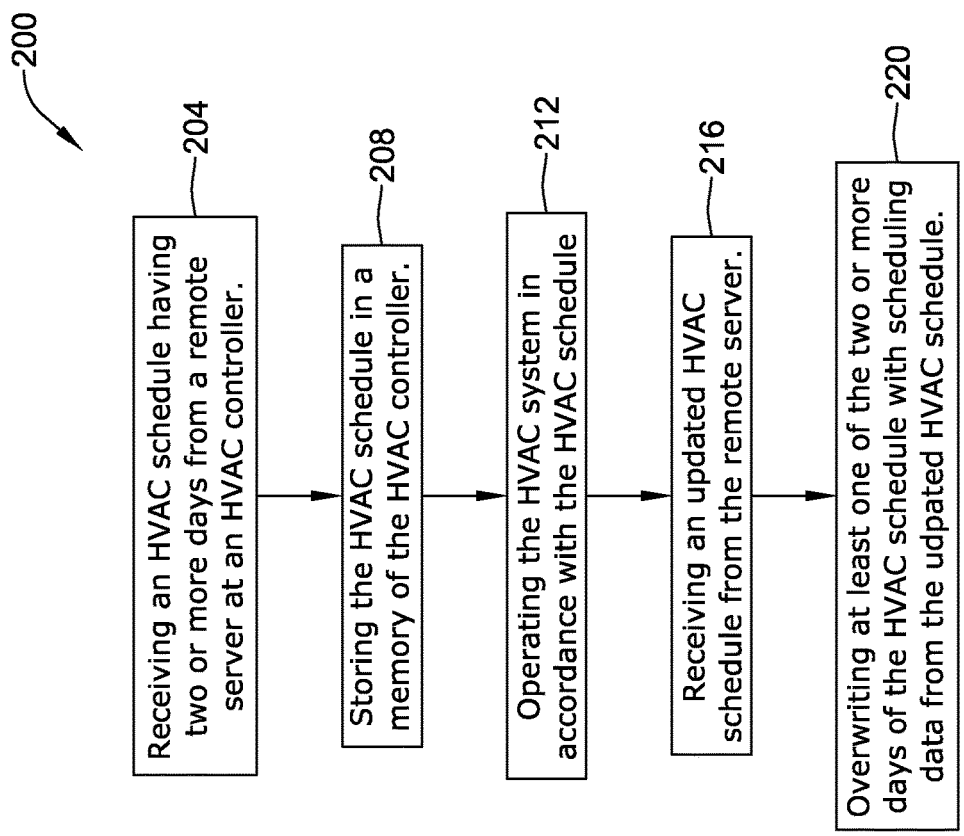
FIG. 7 is a flow chart of a method of controlling an HVAC system in accordance with an HVAC schedule.

FIG. 7 is a flow chart of an illustrative method 200 of controlling an HVAC system in accordance with an HVAC schedule. In some cases, an HVAC schedule including scheduling data may be received by an HVAC controller from a remote server via an external web service as described herein (Block 204). The HVAC schedule may be stored in the memory of the HVAC controller, and the HVAC controller may send out one or more control signals to the HVAC system in accordance with the HVAC schedule stored in the memory (Blocks 208 and 212). The HVAC controller may receive an updated HVAC schedule from the external server via the external web service (Block 216). The updated HVAC schedule may include scheduling data for one or more additional days beyond the at least one day of the HVAC schedule previously stored in the memory of the HVAC controller. In some cases, as described herein, the HVAC controller may receive the updated HVAC schedule according to a predetermined schedule. Upon receiving the updated HVAC schedule, the HVAC controller may overwrite at least one day of the HVAC schedule with scheduling data from the updated HVAC schedule (Block 220). In some cases, the HVAC controller may also receive an updated HVAC schedule at one or more times that are not set by the predetermined schedule. For example, the HVAC controller may receive an updated HVAC schedule when a user changes the HVAC schedule at the external server, resulting in an updated HVAC schedule.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A server accessible over a computer network, the server comprising:
    an input/output port for sending and/or receiving data via the computer network;
    a data storage device;
    a controller coupled to the input/output port and the data storage device, the controller configured to:
        maintain a master HVAC schedule having up to 366 days, the master HVAC schedule being capable of being updated by a user over the computer network via the input/output port of the server;
        translate a sub-portion of the master HVAC schedule into a basic HVAC schedule, wherein the basic HVAC schedule has at least one less day than the master HVAC schedule; and
        deliver the basic HVAC schedule to an HVAC controller over the computer network via the input/output port of the server.

2. The server of claim 1, wherein the controller is further configured to deliver an updated basic HVAC schedule to the HVAC controller according to a predetermined schedule.

3. The server of claim 2, wherein the updated basic HVAC schedule covers at least one day not covered by the previously delivered basic HVAC schedule.

4. The server of claim 1, wherein the controller is further configured to deliver an updated basic HVAC schedule to the HVAC controller in response to an update to the master HVAC schedule.

5. The server of claim 4, wherein the update to the master HVAC schedule is a result of a user updating the master HVAC schedule over the computer network.

6. The server of claim 1, wherein the controller is further configured to deliver an updated basic HVAC schedule to the HVAC controller upon restoration of a lost computer network connection between the HVAC controller and the server.

7. The server of claim 1, wherein the controller is further configured to:
receive scheduling data from a third party calendar application over the computer network;
translate at least a portion of the scheduling data received from the third party calendar application into the master HVAC schedule.

8. The server of claim 1, wherein the master HVAC schedule is associated with a user account.

9. The server of claim 8, wherein the HVAC controller has a unique identifier, which is also associated with the user account.

10. The server of claim 1, wherein the controller is further configured to:
implement a web application, wherein the web application is configured to display one or more web pages viewable from a remote location via the computer network, wherein one or more of the web pages provide a virtual user interface for the HVAC controller.

11. The server of claim 1, wherein the basic HVAC schedule covers at least one day.

12. The server of claim 11, wherein the basic HVAC schedule comprises at least one schedulable time period per day, where each time period has a corresponding operating set point.

13. The server of claim 11, wherein the master HVAC schedule includes thirty days or more for scheduling operation of an HVAC system.

14. An HVAC controller for controlling one or more HVAC components of an HVAC system in accordance with a programmable HVAC schedule, the HVAC controller comprising:
an output port for sending one or more control signals to one or more HVAC components;
a communications port for receiving data from a remote server via a computer network;
a memory having at least one day of a programmable HVAC schedule stored therein;
a controller coupled to the output port, the communications port and the memory, the controller configured to:
output one or more control signals via the output port to control the one or more HVAC components in accordance with the programmable HVAC schedule stored in the memory;
receive an updated HVAC schedule having scheduling data for at least one entire day from the remote server via the communications port; and
overwrite the at least one day of the programmable HVAC schedule stored in the memory of the HVAC controller with scheduling data from the updated HVAC schedule.

15. The HVAC controller of claim 14, wherein the controller is configured to automatically connect with the remote server and receive an updated HVAC schedule in accordance with a predetermined schedule.

16. The HVAC of claim 14, wherein the controller overwrites at least one previous day of the HVAC schedule stored in the memory of the HVAC schedule with scheduling data of the updated HVAC schedule.

17. The HVAC controller of claim 14, wherein the communications port is a wireless communication port including a wireless transceiver for wirelessly sending and/or receiving data.

18. The HVAC controller of claim 14, further comprising a temperature sensor coupled to the controller.

19. The HVAC controller of claim 14, further comprising a display including a user interface coupled to the controller.

20. A method of controlling one or more components of an HVAC system in accordance with a programmable HVAC schedule, the method comprising:
receiving a programmable HVAC schedule having at least one day from a remote server at an HVAC controller;
storing the programmable HVAC schedule in a memory of the HVAC controller;
operating the HVAC system in accordance with the programmable HVAC schedule;
receiving an updated HVAC schedule from the remote server according to a predetermined schedule, the updated HVAC schedule including scheduling data for one or more additional days beyond the at least one day of the programmable HVAC schedule; and
overwriting at least one day of the programmable HVAC schedule with scheduling data from the updated HVAC schedule.

21. The method of claim 20, further comprising:
receiving an updated HVAC schedule from the remote server at one or more times that are not set by the predetermined schedule.

22. The method of claim 21, where at least one of the one or more times that are not set by the predetermined schedule corresponds to a time when a user changes the HVAC schedule on the remote server, resulting in an updated HVAC schedule.

23. A method of controlling one or more components of an HVAC system in accordance with an HVAC schedule, the method comprising:
maintaining at a remote server a master HVAC schedule having scheduling data corresponding to up to 366 days;
translating at least a portion of the scheduling data of the master HVAC schedule into a basic HVAC schedule for controlling one or more components of an HVAC system, the basic HVAC schedule having at least one less day than the master HVAC schedule; and
delivering the basic HVAC schedule to an HVAC controller via a computer network, the HVAC controller controlling one or more components of an HVAC system in accordance with the basic HVAC schedule.

24. The method of claim 23, wherein the remote server receives at least a portion of the master HVAC schedule from a third party calendar over the computer network.

25. The method of claim 23, further comprising:
delivering an updated basic HVAC schedule to the HVAC controller according to a predetermined schedule, the updated basic HVAC schedule including scheduling data for at least one day that is not expressed in the current basic HVAC schedule.

26. The method of claim 23, further comprising:
delivering an updated basic HVAC schedule to the HVAC controller in response to a master HVAC schedule change, the updated basic HVAC schedule including scheduling data associated with the master HVAC schedule change.

* * * * *